United States Patent Office 2,977,458
Patented Mar. 28, 1961

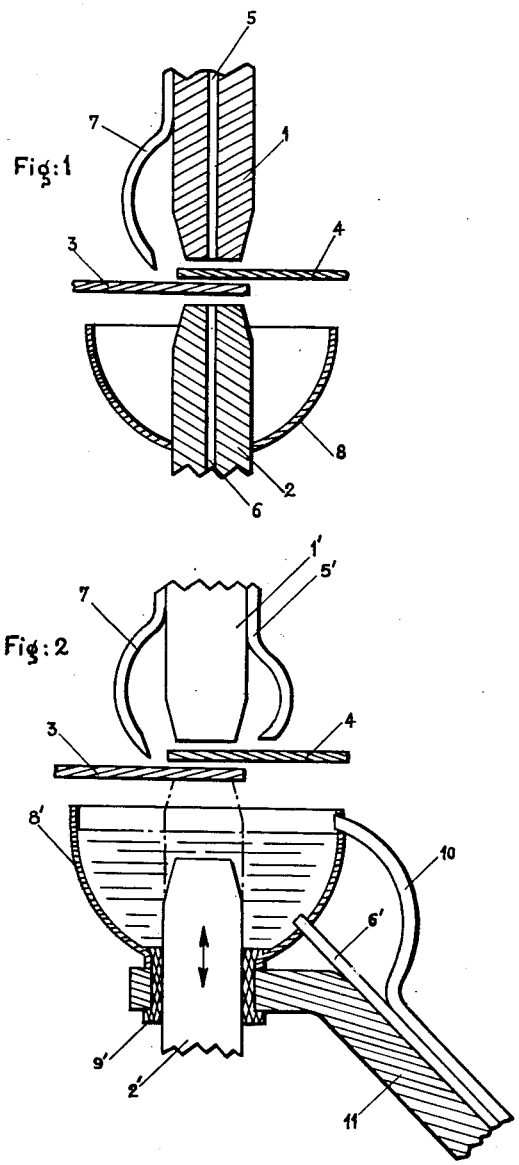
INVENTORS
MARCEL TOURNAIRE
ALBERT TROMPIER

2,977,458
RESISTANCE WELDING OF ALUMINUM AND ITS ALLOYS

Marcel Tournaire and Albert Trompier, Paris, France, assignors to Compagnie Generale du Duralumin et du Cuivre, Paris, France, a corporation of France Filed Feb. 12, 1958, Ser. No. 714,742

Claims priority, application France Feb. 13, 1957

19 Claims. (Cl. 219—118)

This invention relates to method and apparatus for resistance welding or aluminum and its alloys by treatment of the articles to be welded, at least at the portions thereof where welding is to be effected, with a substance that is non-corrosive with respect to the aluminum or the aluminum alloy.

It is known that in the welding of aluminum and its alloys by resistance the articles to be welded should be absolutely clean. For this purpose the articles to be welded are abraded, pickled or freed from grease. These operations, especially the pickling, should be carried out very shortly before the welding.

On the other hand, after a number of welding operations, the electrodes become dirty, they weld poorly and their ends must be cleaned, which requires the standstill of the apparatus.

This invention has for its object a treatment which permits avoiding those separate article cleaning treatments mentioned hereinbefore and increases the number of the welding operations without cleaning the electrodes.

This treatment consists in laying on the articles to be welded an organic nitrogen compound or a higher alcohol. The organic nitrogen compound is preferably an amine. It is for instance diamine dioleate of oleic acid. The higher alcohol may be a monomeric or a polymeric alcohol. The substances used in the treatment of aluminum prior to welding are non-corrosive with respect to the aluminum or an alloy thereof and, accordingly, there may be an extended period of time between the welding operation and the application of the treating substance. It may be applied to the articles either alone or in admixture with a fluid, viscous or pasty hydrocarbon.

The mentioned chemical products bring about the additional advantage, that they allow utilising metals softer than before for constituting the electrodes. The latter may for instance be made of electrolytic copper.

The mentioned products are inserted between the electrodes and the external faces of the articles to be welded. They may also be inserted between the internal faces, which come into contact with each other, of the two articles to be welded.

They may be applied to the articles to be welded a long time before the welding operation. They then protect them against the corrosive action of damp air. They therefore can replace the lubricants previously utilised for the same purpose.

The accompanying Figures 1 and 2 show two different apparatus for applying one of the above mentioned products immediately before the welding operation.

Figure 1 illustrates two electrodes 1 and 2 made, for example, of soft electrolytic copper and disposed opposite each other with overlapped portions of two aluminum or aluminum alloy articles 3 and 4 disposed therebetween and arranged to be gripped by the electrodes as the latter are moved relatively toward each other to pass a welding current through the articles.

The welding electrodes 1 and 2 are provided with longitudinally extending bores 5 and 6, respectively, with the open ends of the bores exposed at the ends of the electrodes which contact the articles 3 and 4 so that the chemical treating product defined hereinbefore may be caused to flow through the bores and onto the surfaces of the articles and the electrodes which are abutted during a welding operation. The chemical treating product may also be supplied to the faces of the articles which abut each other by means of the supply tube 7 secured adjacent the upper control electrode 1 and with an outlet facing the junction of the two articles and so arranged with respect thereto that the chemical product from the tube 7 may readily be supplied between the articles 3 and 4. The excess of the treating product may be caught in a cup 8 extending about the lower electrode 2.

In Figure 2, there is illustrated apparatus generally similar to that shown in Figure 1, wherein like or similar parts are identified with the same reference numeral but with a prime notation. The two electrodes 1' and 2' may, in this instance, be solid and the two channels or tubes 5' and 6' are now located at the side of the respective electrodes for supplying the aforementioned chemical treating product. The lower electrode 2' may be reciprocably moved relative to electrode 1' and cup 8' through a liquid-tight packing box 9' at the base of the cup 8' which surrounds the electrode, the upper surface of electrode 2' in its lower or withdrawn position being below the surface of the chemical treating liquid supplied to the cup by the channel 6', the liquid level being determined by the level of the overflow channel 10 connected to the cup 8' near the upper rim portion thereof for withdrawing excess liquid. Accordingly, the electrode 2' is covered with the liquid of the cup 8' when it rises therefrom into contact with the article so that a portion of the treating liquid is provided between the article 3 and the electrode 2'.

The cup 8' and the fluid or liquid connections thereto as seen in Figure 2 may be supported by a suitable support structure represented by the structure 11 in the drawing.

We claim:

1. Process for improving the welding characteristics of the welding surfaces of aluminum or of aluminum alloy articles to be welded by resistance welding consisting in depositing thereon a non-corrosive product selected from the group consisting of an organic nitrogen compound and a higher alcohol.

2. A process for improving the welding characteristics of the welding surfaces of aluminum or of aluminum alloy articles to be welded by resistance welding consisting in depositing thereon a non-corrosive organic nitrogen compound.

3. Process according to claim 2, in which the organic nitrogen compound is an amine.

4. Process according to claim 3, in which the amine is diamine dioleate of oleic acid.

5. A process for improving the welding characteristics of the welding surfaces of aluminum or aluminum alloy articles to be welded by resistance welding consisting in depositing thereon a non-corrosive higher alcohol.

6. Process according to claim 5, in which a hydrocarbon is admixed with the higher alcohol.

7. Process according to claim 2, in which a hydrocarbon is admixed with the nitrogen compound.

8. A process for resistance welding aluminum and its alloys comprising depositing on the welding surfaces of the articles to be welded an organic substance which is non-corrosive with respect to the article and selected from the group consisting of an organic nitrogen compound and a higher alcohol, holding said welding surfaces of the articles in engagement with each other between welding electrodes and passing a welding current therethrough.

9. A process according to claim 8, in which only the non-corrosive substance is used free of all admixture.

10. The process according to claim 8, in which the non-corrosive substance is admixed with a hydrocarbon.

11. A process according to claim 8, in which the non-corrosive substance is an amine.

12. A process according to claim 11, in which the non-corrosive amine substance is diamine dioleate of oleic acid.

13. A process according to claim 8, in which the organic substance is deposited on the welding surfaces of the articles and on the welding electrodes during the welding operation.

14. A process according to claim 8, in which the organic substance is deposited on the welding surfaces of the articles and on the welding electrodes immediately before the welding operation.

15. The process according to claim 8, in which the organic substance is deposited initially solely on the surfaces of the articles to be welded.

16. Apparatus for resistance welding of articles including electrode means for engaging said articles to pass a welding current therethrough, and means for dispensing a chemical substance in the welding area at said electrodes to improve the weld obtained by said apparatus, said dispensing means being so constructed and arranged as to supply the chemical substance not only between the electrodes and the portions of the articles abutted thereby but also between the article surfaces to be welded together.

17. Apparatus according to claim 16, wherein the dispensing means is at least partially constituted by a channel in at least one of said electrodes having a channel outlet at the face of said electrode which contacts an article to be welded so as to supply between said face and the article some of the chemical substance.

18. Apparatus according to claim 16, further including a receptacle below the welding area between the electrodes for recovering excess of the chemical substance applied to said articles.

19. Apparatus according to claim 18, in which one electrode of said electrode means is retractable inside said receptacle to permit a chemical substance in said receptacle to cover the article-engaging face of said one electrode, said receptacle having packing means with said one electrode extending therethrough and being movable relative to the receptacle, said receptacle further including means for removing excess of said chemical substance from said receptacle to maintain a desired level of the chemical substance therein.

References Cited in the file of this patent

UNITED STATES PATENTS

| | | |
|---|---|---|
| 1,115,943 | Knipe | Nov. 3, 1914 |
| 1,692,358 | Sugden | Nov. 20, 1928 |
| 1,804,059 | Miller | May 5, 1931 |
| 2,001,688 | Paugh | May 14, 1935 |
| 2,253,375 | Henninger | Aug. 19, 1941 |
| 2,681,402 | Muller | June 15, 1954 |
| 2,829,236 | Miles | Apr. 1, 1958 |

FOREIGN PATENTS

| | | |
|---|---|---|
| 65,888 | Austria | July 25, 1914 |
| 483,355 | Canada | May 20, 1952 |

OTHER REFERENCES

"Welding Engineers," March 1944, page 46 (research).